2,724,712

CARBOBENZOXYPIPERAZINE-OXIDES AND METHODS FOR PREPARING THE SAME

Leon Goldman, Nanuet, N. Y., and Richard P. Williams, Westwood, N. J., assignors to American Cyanamid Company, New York, N. Y., a corporation of Maine No Drawing. Application February 19, 1954,
Serial No. 411,586

13 Claims. (Cl. 260—268)

This invention relates to a new series of organic compounds. More particularly it relates to carbobenzoxypiperazine oxides having a variety of substituents on the oxide nitrogen.

Piperazine oxides have been previously disclosed by Denton and Stewart (U. S. Patent No. 2,578,053). These compounds however are limited to those having di-lower-alkyl carbamyl groups in the $N^1$ position and the methyl group in the $N^4$-oxide position. In addition, these compounds possess therapeutic limitations in that they are useful only as ascaricides and as filaricides.

I have now discovered that when the $N^1$ position of the piperazine has a carbobenzoxy substituent and the $N^4$-oxide position has alkyl, aralkyl, or alicyclic substituents, a new series of therapeutically active compounds results. These compounds have a wide variety of applications in that they possess antimicrobial activity against such bacteria as *Bacillus subtilis, Staphylococcus aureus, Mycobacterium sp. 607, Sarcina lutea* and such fungi as *Saccharomyces carlsbergensis, Mucor ramannianus, Hormodendrum cladosporoides, Trichophyton mentagrophytes,* and *Fusarium epispharia.* In addition, these compounds are useful antispasmodics and anticonvulsants.

Compounds of this invention are those having the general formula:

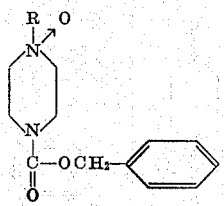

wherein R is a member selected from the group consisting of lower-alkyl, aralkyl, and alicyclic radicals. As examples, may be given the alkyl groups—methyl, ethyl, n-propyl, n-butyl, and pentyl; the aralkyl groups—benzyl, phenylacetyl, diphenylacetyl, and phenylpropyl and the alicyclic groups—cyclopropyl, cyclopentyl, cyclobutyl, and cyclohexyl.

The piperazine oxides of this invention are stable, hygroscopic compounds, soluble in water, and inert organic solvents. They are capable of forming the corresponding salts on treatment with most acids, such as sulfuric, hydrochloric, picric, oxalic, and the like.

While it is not intended that the piperazine oxides of this invention be limited to those prepared by any specific process, a particularly convenient method for preparing the new compounds has been discovered and this new method also constitutes a part of this invention. The new method comprises reacting an $N^1$-carbobenzoxy-$N^4$-substituted-piperazine (such as that described by Goldman and Williams in copending U. S. application, S. N. 418,456 filed March 24, 1954) with a suitable oxidizing agent such as a peroxide or peracid in the presence of a solvent.

The peroxides which are suitable oxidizing agents for this reaction are hydrogen peroxide, sodium peroxide and the like. The peracids which may be employed as oxidizing agents in this reaction are peracetic, performic, perbenzoic, monoperphthalic, and pertrifluoroacetic. In this invention hydrogen peroxide is the preferred oxidizing agent. Although the strength used may vary from 3% to 100%, the preferred concentration is 5%.

The reaction may be conveniently carried out in any solvent which is inert to the oxidizing agent employed, such as for example, water, the lower-alkyl alcohols, lower-alkyl ketones and the like. For the purpose of this invention, ethanol is the preferred solvent.

Stoichiometric ratios of carbobenzoxypiperazine to oxidizing agent need not be maintained during the reaction, but it is important to employ an excess of oxidizing agent in order to insure complete oxidation of the $N^1$-carbobenzoxy-$N^4$-substituted-piperazine. The reaction reaches completion over a wide limit of time—namely, from a spontaneous completion up to a period of one week. The temperature during the reaction is not critical and may vary from 0° C. to 100° C., room temperature being preferred and most convenient.

When the reaction is complete, the excess peroxide may be conveniently removed by refluxing in the presence of platinum oxide catalyst. The latter method is highly selective in that it destroys the excess peroxide but leaves the newly formed nitrogen-oxygen linkage intact.

The following examples will serve to describe the invention in more complete detail. All parts are by weight unless otherwise indicated.

Example I

To a solution of 220 ml. of neutralized 30% hydrogen peroxide in 600 ml. of ethanol, 46.8 grams of 1-carbobenzoxy-4-methylpiperazine was added with shaking. The reaction mixture was left at room temperature for 1 week. After decomposing the excess hydrogen peroxide by refluxing with a small amount of Adams' platinum catalyst and filtering, the filtrate was concentrated under reduced pressure. The residual oil was crystallized by distilling repeatedly with absolute ethanol under reduced pressure, yielding 52 grams of 1-carbobenzoxy-4-methylpiperazine-4-oxide melting at 126°–133° C. The light tan, crystalline product was very hygroscopic. Recrystallization from undried acetone gave 22.5 grams of colorless crystals melting at 103–104° C. which analyzed for a hydrate containing three-fourths of a mole of water. A portion of this hydrated product was heated under reduced pressure, first at 80° C. and then at 100° C., for several hours to give colorless crystals of the anhydrous product melting at 149.5–150.5° C. (sealed tube).

Example II

A mixture of 5 ml. of 1-carbobenzoxy-4-methylpiperazine and 110 ml. of 5.5% hydrogen peroxide was stirred vigorously for one hour and then allowed to stand for several days. A small amount of Adams' platinum catalyst was added to the solution while warming on the steam bath to decompose the excess hydrogen perxide. After removing the platinum oxide by filtration, the filtrate was concentrated to dryness under reduced pressure to yield 5.4 grams of 1-carbobenzoxy-4-methylpiperazine-4-oxide as a dark brown oil. The oil was converted to the picrate by dissolving it in alcohol and acidifying with alcoholic picric acid. Yellow crystals, 4.4 grams, melting at 203–204° C., were obtained by filtration.

Example III 1-carbobenzoxy-4-ethylpiperazine, 49.5 grams, was dissolved in 220 ml. of neutralized 30% hydrogen peroxide and 600 ml. of absolute ethanol, and the solution was left at room temperature for a week. After destroying the excess hydrogen peroxide by refluxing with a small amount of Adams' platinum catalyst and filtering, the filtrate was evaporated under reduced pressure. The residual oil was crystallized by distilling repeatedly with absolute ethanol under reduced pressure. The resulting colorless crystals of 1-carbobenzoxy-4-ethylpiperazine-4-oxide weighed 42 grams and had a M. P. of 138° C. (dec.). Recrystallization from undried acetone gave 18.5 grams of 1-carbobenzoxy-4-ethylpiperazine-4-oxide monohydrate, M. P. 92.5–93.5° C. A portion of the hydrate was heated under reduced pressure first at 80° C. and then at 100° C. for 2 hours, giving colorless crystals, M. P. 140° C. (dec.), which analyzed for a hydrate containing one-fourth mole of water.

Example IV 1-carbobenzoxy-4-n-propylpiperazine, 15.0 grams, was dissolved in 75 ml. of neutralized 30% hydrogen peroxide and 180 ml. of absolute ethanol, and the mixture was left at room temperature for 7 days. The reaction was then refluxed for 3 hours with a small amount of Adams' platinum catalyst to decompose the excess hydrogen peroxide, and the catalyst was removed by filtration. The filtrate was evaporated under reduced pressure and the residual oil was crystallized by distilling repeatedly with absolute ethanol; yield: 16.7 grams of colorless crystals of 1-carbobenzoxy-4-n-propylpiperazine-4-oxide, melting at 158° C. (dec.). Recrystallization from acetone-ether gave colorless crystals melting at 159° C. (dec.).

Example V 1-carbobenzoxy-4-n-butylpiperazine, 24.6 grams, was dissolved in 100 ml. of neutralized 30% hydrogen peroxide and 300 ml. of ethanol, and the solution was left at room temperature for one week. The excess hydrogen peroxide was then decomposed by refluxing with a small amount of Adams' platinum catalyst for 3 hours and filtering. The filtrate was concentrated to dryness under reduced pressure and the residue was crystallized by repeatedly distilling under reduced pressure with ethanol, giving 27.1 grams of colorless crystals of 1-carbobenzoxy-4-n-butylpiperazine-4-oxide, melting at 139° C. (dec.). Recrystallization from acetone-ether gave 17 grams of hygroscopic colorless crystals which after being dried at 100° C. under reduced pressure for 2 hours, melted at 146–147° C. (dec.).

Example VI 1-carbobenzoxy-4-cyclohexylpiperazine, 17.6 grams, was dissolved in 75 ml. of neutralized 30% hydrogen peroxide and 180 ml. of absolute ethanol, and the solution was left at room temperature for 7 days. The reaction mixture was then refluxed with a small amount of Adams' platinum catalyst for 3 hours to decompose excess hydrogen peroxide, and the catalyst was removed by filtration. The filtrate was evaporated under reduced pressure and the residual oil was crystallized by distilling repeatedly with absolute ethanol. The yield was 20.3 grams of 1-carbobenzoxy-4-cyclohexylpiperazine-4-oxide, melting at 159° C. (dec.). Recrystallization from acetone-ethanol gave colorless crystals melting at 170–171° C. (dec.).

Example VII

A solution of 3.1 grams of 1-carbobenzoxy-4-benzylpiperazine, 11 ml. of 30% hydrogen peroxide, previously neutralized by shaking with barium carbonate and filtering, and 30 ml. of absolute ethanol was allowed to stand at 25° C. for 65 hours. The reaction mixture was stirred with a small amount of Adams' platinum catalyst to decompose the excess peroxide and then filtered. The filtrate was concentrated to dryness under vacuum, and, after washing the residue with ether, 2.5 grams of colorless crystals of 1-carbobenzoxy-4-benzylpiperazine-4-oxide, melting at 177–178° C. were obtained. Recrystallization from acetone gave colorless crystals, which, after drying under reduced pressure, melted at 176° C.

Example VIII 1-carbobenzoxy-4-benzylpiperazine, 60.5 grams, was dissolved in 600 ml. of absolute ethanol, and 220 ml. of 30% hydrogen peroxide (neutralized by shaking with solid barium carbonate) was added. After 4 days at 20° C., 200 mg. of Adams' platinum catalyst was added to decompose the excess hydrogen peroxide. When evolution of oxygen had ceased the mixture was filtered, and the filtrate was concentrated to dryness under reduced pressure, yielding 61 grams of colorless crystals of 1-carbobenzoxy-4-benzylpiperazine-4-oxide, melting at 175–176° C.

We claim:
1. Compounds having the general formula:

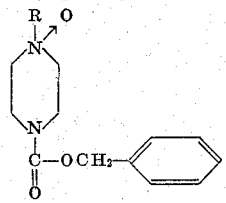

wherein R is a member selected from the group consisting of lower-alkyl, benzyl, and cyclohexyl radicals.
2. The 1 - carbobenzoxy - 4 - lower - alkylpiperazine-4-oxides.
3. 1-carbobenzoxy-4-methylpiperazine-4-oxide.
4. 1-carbobenzoxy-4-n-butylpiperazine-4-oxide.
5. 1-carbobenzoxy-4-n-propylpiperazine-4-oxide.
6. 1-carbobenzoxy-4-benzylpiperazine-4-oxide.
7. 1-carbobenzoxy-4-cyclohexylpiperazine-4-oxide.
8. A method for preparing compounds having the general formula:

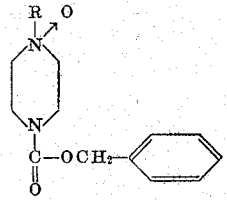

wherein R is a member selected from the group consisting of lower-alkyl, benzyl, and cyclohexyl radicals, which comprises reacting a compound having the general formula:

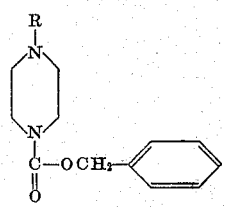

with hydrogen peroxide in the presence of an inert solvent.
9. A method for preparing 1-carbobenzoxy-4-methylpiperazine-4-oxide, which comprises treating 1-carbobenzoxy-4-methylpiperazine with hydrogen peroxide in the presence of an inert solvent.
10. A method for preparing 1-carbobenzoxy-4-n-propylpiperazine-4-oxide, which comprises treating 1-carbobenzoxy-4-n-propylpiperazine with hydrogen perixide in the presence of an inert solvent.
11. A method for preparing 1-carbobenzoxy-4-n-butylpiperazine-4-oxide, which comprises treating 1-carbobenzoxy-4-n-butylpiperazine with hydrogen peroxide in the presence of an inert solvent.
12. A method for preparing 1-carbobenzoxy-4-benzylpiperazine-4-oxide, which comprises treating 1-carbobenzoxy-4-benzylpiperazine with hydrogen peroxide in the presence of an inert solvent.
13. A method for preparing 1-carbobenzoxy-4-cyclohexylpiperazine-4-oxide, which comprises treating 1-carbobenzoxy-4-cyclohexylpiperazine with hydrogen peroxide in the presence of an inert solvent.

References Cited in the file of this patent

FOREIGN PATENTS 495,129    Belgium _____ Apr. 29, 1950